Patented Apr. 11, 1939

2,153,732

UNITED STATES PATENT OFFICE 2,153,732

THIO-BARBITURIC ACID DERIVATIVES

Ernest H. Volwiler, Highland Park, and Donalee L. Tabern, Lake Bluff, Ill., assignors to Abbott Laboratories, North Chicago, Ill., a corporation of Illinois No Drawing. Application July 8, 1938, Serial No. 218,103

3 Claims. (Cl. 260—260)

The present application, a continuation-in-part, of our co-pending application, Serial No. 720,804, filed April 16, 1934, is directed to thio-barbituric acid derivatives, having the structure

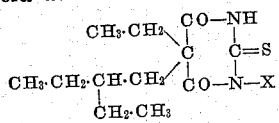

in which X represents hydrogen, an alkali or alkaline earth metal, or a primary or secondary alkyl amine.

The compound of the present invention is an efficacious hypnotic and sedative. In general, the thio-barbituric acid derivatives are as or more effective in this regard than the oxygen analogs, and in addition, certain members, including the species to which the present invention is directed, show a definitely shorter period of hypnotic action. The compound of the present invention is rapidly detoxified in the body which is of clinical advantage, as, for example, when the compound is used as a surgical anesthetic or pre-anesthetic.

The ethyl (2-ethyl butyl) thio-barbituric acid species illustrated by the above formula may be prepared as follows:

Cyanoacetic methyl ester in absolute alcohol is treated with one molecular equivalent of sodium ethylate and then one molecular equivalent of 2-ethyl butyl bromide. Sodium bromide soon separates, and after refluxing gently until neutral, the solution yields the mono (2-ethyl butyl) cyanoacetic ester. This ester in a sodium ethylate solution is then treated with one molecular equivalent of ethyl bromide. The reaction is immediate and, after a few hours standing, usual methods of isolation yield the ethyl (2-ethyl butyl) cyanoacetic methyl ester.

About 273 grams of the ethyl (2-ethyl butyl) cyanoacetic ester and 110 grams of thio-urea are then refluxed with stirring for about two hours in an alcohol solution of sodium ethylate made by dissolving 49 grams of sodium in a minimum of absolute alcohol. The solvent is next evaporated and the mass heated for about one half hour at 100–110° C. The solid is then dissolved in cold water and precipitated by addition of dilute acetic acid. The resulting ethyl (1-methyl butyl) imino thio-barbituric acid is purified by recrystallization from dilute alcohol.

The imino compound may be hydrolyzed to the thio-barbituric acid by treatment with acids such as sulphuric, nitric, hydrochloric, phenol-sulfonic, acetic, etc. The following will serve for illustrative purposes:

5 grams of the ethyl (2-ethyl butyl) imino thio-barbituric acid is added to a mixture made up of 100–125 cc. of water and 10 cc. of sulphuric acid. On gentle refluxing for several hours a clear solution is formed which gradually (more rapidly on cooling) deposits the thio-barbituric acid. The resulting ethyl (2-ethyl butyl) thio-barbituric acid after the usual methods of purification e. g. recrystallization from dilute alcohol, melts at about 136°–137° C.

As described in the parent application, the thio-barbituric acid derivatives may also be prepared by the malonic ester synthesis. This well known method of preparation consists in the condensation of one molecular equivalent of a mono- or di-substituted malonic ester with one or two molecular equivalents of thio-urea in the presence of two to four molecular equivalents of sodium ethylate. The solvent used for this reaction may be alcohol or a similar solvent; a quantity of the solvent is preferably removed to enable a temperature of from 100° to 120° C. to be reached. The impure sodium salt thus formed is dissolved in cold water and precipitated by an acid. Purification may be accomplished by dissolving the barbituric acid derivative in alkali and reprecipitating by acid, followed by recrystallization from alcohol, dilute alcohol, benzene, or other suitable solvent; or by sublimation, or other suitable technique.

*Salts*

The thio-barbituric acids as described in the parent application are acid in character, forming salts with alkali and alkaline earth metals and with organic bases. These salts are stable in the solid state and reasonably so in solution.

The sodium salts may be prepared by dissolving one molecular equivalent of the thio-barbituric acid in warm absolute alcohol, which is added to a solution of one atomic equivalent of sodium ethylate in absolute alcohol. Upon evaporation of the alcohol, the sodium salt separates as a crystalline, slightly hygroscopic solid, readily soluble in water. The hydrogen ion concentrations of aqueous solutions of the salts are similar to those of the corresponding oxygen analogs.

The calcium salts may be produced by dissolving or suspending the thio-barbituric acid in water, alcohol, or dilute alcohol, adding an excess of lime, stirring, filtering, and concentrating the resultant solution. The calcium salts are readily soluble in water. A preferable method in the case of certain of the higher homologs where the calcium salts are less soluble, is the addition of a strong solution of calcium chloride or acetate to a solution of an alkaline earth or ammonium salt. The precipitated calcium salt may be readily filtered off and air-dried. Example: The calcium salt of ethyl (2-ethyl butyl) thio-barbituric acid.

The mono alkyl and di-alkylamine salts may be prepared by dissolving the thio-barbituric acid in a slight excess of the amine, and removing the excess amine. These salts are readily soluble in water, but are easily hydrolyzed. The lower alkylamine salts in the solid state readily lose the amine, leaving behind the thio-barbituric acid.

We claim:

1. The compound having the formula:

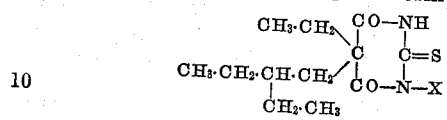

where X is selected from the group consisting of hydrogen, alkali and alkaline earth metals and the primary and secondary alkyl amines.

2. An ethyl, 2-ethyl butyl thio-barbiturate hypnotic.

3. An anesthetic, sedative and sleep producing compound having the following formula:

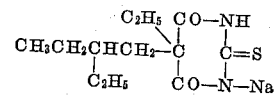

ERNEST H. VOLWILER.
DONALEE L. TABERN.